United States Patent [19]

Maitani et al.

[11] 4,272,176
[45] Jun. 9, 1981

[54] CAMERA HAVING AN ACOUSTIC INDICATOR FOR GENERATING SOUNDS TO INDICATE THE STATUS OF CERTAIN OPERATING CONDITIONS

[75] Inventors: Yoshihisa Maitani; Isao Kondo; Kazuyuki Nemoto; Masahiro Kitagawa, all of Hachioji, Japan

[73] Assignee: Olympus Optical Co., Ltd., Tokyo, Japan

[21] Appl. No.: 950,851

[22] Filed: Oct. 12, 1978

[30] Foreign Application Priority Data

Nov. 15, 1977 [JP] Japan .......................... 52-153242[U]
Nov. 22, 1977 [JP] Japan .......................... 52-157047[U]

[51] Int. Cl.³ .................... G03B 17/20; G03B 17/40
[52] U.S. Cl. .................................... 354/238; 354/289
[58] Field of Search ............... 354/60 E, 60 L, 53, 354/23 D, 60 A, 237, 238, 230, 240, 289; 340/328, 329, 658, 659, 331, 384 E; 331/46, 49, 50, 52, 56, 47; 352/170, 171

[56] References Cited

U.S. PATENT DOCUMENTS

| 3,487,404 | 12/1969 | Midkiff ............................. 340/384 E |
| 3,592,113 | 7/1971 | Von Wasielewski .............. 354/53 X |
| 3,776,625 | 12/1973 | Fountain ............................. 352/170 |
| 3,872,470 | 3/1975 | Hoertz et al. ..................... 340/384 E |
| 3,956,758 | 5/1976 | Numata et al. ....................... 354/53 |
| 4,047,210 | 9/1977 | Espig ................................... 354/238 |
| 4,114,176 | 9/1978 | Kawasaki ............................. 354/289 |

FOREIGN PATENT DOCUMENTS 47-30209 8/1972 Japan .

*Primary Examiner*—L. T. Hix
*Assistant Examiner*—William B. Perkey
*Attorney, Agent, or Firm*—Weinstein & Sutton

[57] ABSTRACT

A camera includes a circuit which determines the level of a supply voltage and a self-timer delay circuit associated with an electrical shutter. The camera also includes an acoustic indicator which includes a pulse oscillator and a small size acoustic alarm unit and which operates to produce a sound substantially continuously to indicate the level of the supply voltage and to produce a sound intermittently in order to indicate that the self-timer is in operation.

5 Claims, 10 Drawing Figures

CAMERA HAVING AN ACOUSTIC INDICATOR FOR GENERATING SOUNDS TO INDICATE THE STATUS OF CERTAIN OPERATING CONDITIONS

BACKGROUND OF THE INVENTION

The invention relates to a camera with an acoustic indicator associated with an electrical shutter, and more particularly, to such camera including a battery checker and a self-timer in which an acoustic indicator is provided to indicate the result of checking the supply voltage and to indicate that the self-timer is in operation.

There are a variety of indicator arrangements associated with a battery checker of a camera, including (1) a lamp or light emitting diode located within a viewfinder or on the external surface of the camera and which is illuminated in response to the depression of a release button;

(2) a check actuating member which may be brought to a check position to cause the pointer of an exposure meter to deflect if the supply voltage is above a given level;

(3) a light emitting element located within the viewfinder for the purpose of displaying exposure information and which is also used to indicate the result of a battery check so as to illuminate in response to the closure of a switch ganged with a release button or of a separate switch;

(4) a battery check switch which may be operated to illuminate a light emitting diode or lamp located on the external surface of the camera; and (5) a check switch which when operated, causes a continuous illumination of a light emitting element if the supply voltage is sufficiently high, a flashing when it is low, or to cause the element to remain unilluminated when the battery is exhausted.

However, it will be noted that these indicator arrangements are visual in nature, presenting difficulty in bright places where the indication is given on the external surface of the camera or requiring a view of the viewfinder where the indication is given within the viewfinder which is undesirable from the standpoint of the ease of use. In addition, an automatic reset mechanism for the checking member is required in order to prevent the checking member from being left in the actuated position.

On the other hand, the operation of a self-timer in a camera is usually indicated by an illumination or a flashing of a lamp or the like, which is again visual in nature. However, such visual display also presents difficulty in recognizing the emission of light under a bright illumination as experienced outdoors.

SUMMARY OF THE INVENTION

It is a first object of the invention to provide a camera with an electrical shutter and an acoustic indicator which permits an auditory recognition of the result of checking a supply voltage.

It is a second object of the invention to provide a camera with an electrical shutter and an acoustic indicator including a sound producing element which may be fed with an output of a pulse oscillator during the operation of a self-timer to provide an acoustic indication that the self-timer is in operation.

In accordance with the invention, an indication that the supply voltage is above a given level or an indication that the self-timer is in operation is given as a continuous or intermittent sound output from the acoustic indicator, respectively. As compared with the conventional luminous display, this presents a number of advantages which are stated below.

(1) An auditory recognition of the supply voltage or the operation of the self-timer is greatly facilitated, even under bright illumination as experienced outdoors in the summer or in skiing areas.

(2) The acoustic indication provides a positive indication of the battery check or self-timer operation, and avoids the need for the provision of a mechanical automatic reset which would otherwise be required to prevent an operating knob or like member from being left in its actuated position. Since the indication is controlled by turning a switch on and off, its location can be freely determined during the design or layout of the camera.

(3) The result of a battery check operation can be recognized while viewing the viewfinder or while maintaining the camera in the hands of a user.

(4) A luminous display in the form of a light emitting diode may be used in combination, thus permitting a combined visual and auditory indication.

(5) A small size sound producing element and light emitting diode can be used to indicate the operation of the self-timer and the result of the battery check operation, thus minimizing any increase in the cost required.

BRIEF DESCRIPTION OF THE DRAWINGS

FIGS. 7 to 9 are similar views to FIGS. 5 and 6, illustrating the mechanism in its operative positions; and FIG. 10 is a circuit diagram of another example of electrical shutter circuit incorporating the acoustic indicator of the invention;

DESCRIPTION OF PREFERRED EMBODIMENTS

Figure 1:
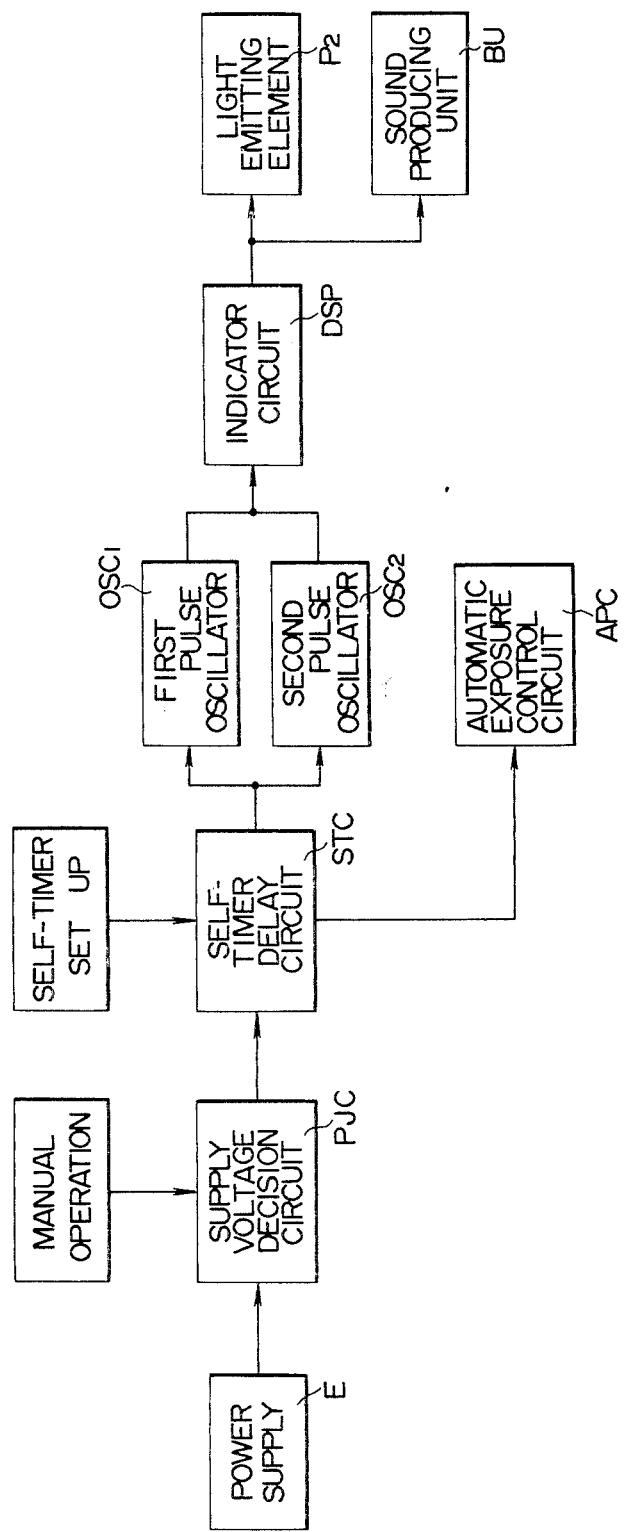
FIG. 1 is a block diagram of the acoustic indicator of the camera of the invention.

Referring to FIG. 1, there is shown a block diagram of the acoustic indicator which is used in combination with an electrical shutter of a camera. When taking a picture, it is necessary to check whether a battery E has a sufficient voltage to operate the electrical shutter circuit. This can be performed by a manual operation of a changeover switch which is then thrown to a battery check position to activate a supply voltage decision circuit PJC. If it is found that the supply voltage is above a given level, an indicator circuit DSP including a small size acoustic alarm unit BU and light emitting element P2 as well as a pulse oscillator OSC1 are activated, causing unit BU to produce a sound continuously and causing the element P2 to illuminate continuously. Such indication is easily detected or recognized, and the changeover switch is returned to its original position to complete a battery check operation. Subsequently, a picture can be taken in the usual manner or using a self-timer.

When taking a picture using a self-timer, a knob or like member is operated to set up a self-timer. A shutter button is then depressed to initiate a photographing operation. Specifically, in response to the depression of the shutter button, a self-timer delay circuit STC is activated to operate oscillators OSC1, OSC2 as well as indicator circuit DSP which includes the unit BU and element P2. As the circuit DSP is operated, the unit BU produces sound intermittently and the element P2 is illuminated intermittently, indicating that the self-timer is in operation, both acoustically and visually. When the self-timer times out, the delay circuit STC becomes effective to operate an exposure control circuit APC of the shutter, completing a photographing operation in the normal automatic exposure mode. The unit BU and the element P2 are deactivated at the same time as the self-timer times out as usual.

A specific arrangement of the acoustic indicator of the invention, which has been described in general terms above, will now be described more closely with reference to FIG. 2. The indicator circuit is assembled into an electrical shutter circuit of an automatic exposure camera, which circuit is shown in FIG. 2.

Figure 2:
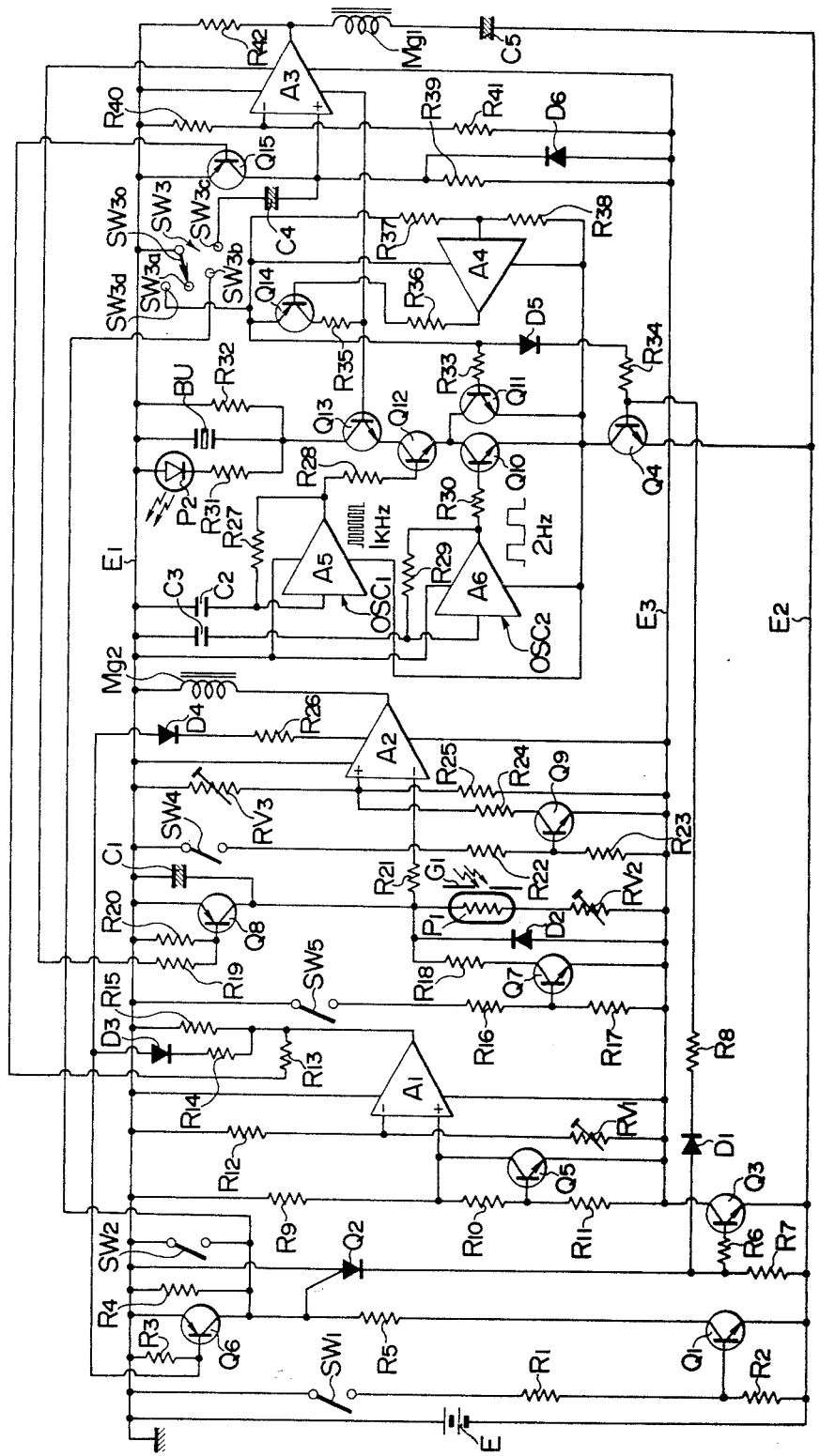
FIG. 2 is a circuit diagram of an electrical shutter circuit which includes the electrical circuit of the acoustic indicator.

Referring to FIG. 2, a power supply E has its positive terminal connected with bus E1 and its negative terminal connected with another bus E2. Connected in shunt across these busses E1 and E2 are a series circuit including release switch SW1 which is closed in response to the depression of a shutter button, and resistors R1 and R2; a second series circuit including disconnection transistor Q6, resistor R5 and start transistor Q1; and a third series circuit including connection transistor Q2 formed by programmable unijunction transistor PUT and resistor R7. Transistor Q2 has its anode connected with bus E1 and its cathode connected with resistor R7 while its gate is connected with the collector of transistor Q6. Resistor R4 and disconnection switch SW2 are connected in parallel between the gate of Q2 and bus E1. Resistor R3 is connected between the base of transistor Q6 and bus E1.

Also connected across buses E1, E2 is a series path including resistor R42, release electromagnet Mg1, and capacitor C5. Capacitor C5 is normally charged from supply E, but discharges in a pulse-like manner through electromagnet Mg1 when switch SW1 is closed in response to the depression of the shutter button, thus energizing the electromagnet to start a shutter mechanism.

A further bus E3 is connected with bus E2 through switching transistor Q3, and an automatic exposure control circuit which forms the heart of the electrical shutter circuit is connected across busses E1 and E3. Transistor Q3 has its collector connected with bus E3, its emitter connected with bus E2 and its base connected with the junction between transistor Q2 and resistor R7 through resistor R6. Transistor Q3 is turned on when transistor Q2 is rendered conductive, thus connecting bus E3 with bus E2. In this manner, transistor Q3 in effect forms a power switch.

Connected across busses E1 and E3 are a regulator circuit including a series combination of resistors R9, R10 and R11 and transistor Q5 and forming a constant voltage source; a voltage divider including resistor R12 and variable resistor RV1; and a supply voltage detector which is formed by comparator A1. Resistor R15 is connected between the output of comparator A1 and bus E1 while a series combination of resistor R14 and diode D3, which forms a power supply disconnection circuit is connected between the output of comparator A1 and the base of transistor Q6. The detector is followed by a series circuit including normally open switch SW5 which is closed during a flash photography, and resistors R16 and R17; and a long exposure period circuit formed by a series circuit of resistor R18 and transistor Q7. Then follow a series circuit including time constant capacitor C1, light receiving element P1 formed by a photoelectric transducer element such as a CdS element and semi-fixed resistor RV2; a voltage divider including semi-fixed resistor RV3 and resistor R25; and an automatic exposure control circuit including comparator A2 which is used for the purpose of photometry. The junction between capacitor C1 and element P1 is connected through resistor R21 with one input of comparator A2 while the junction between resistors RV3 and R25 of the voltage divider is connected with the other input of comparator A2. Diode D2 is connected between the junction between capacitor C1 and element P1 and bus E3, and transistor Q8, which forms a trigger switch, is connected in shunt with capacitor C1 across the same junction and bus E1. Resistor R20 is connected between the base of transistor Q8 and bus E1, and the base of Q8 is also connected with resistor R19 which is effective to apply an actuate signal from comparator A3 to be described later. Also connected across busses E1 and E3 are a series circuit including switch SW4 and resistors R22 and R23; and an exposure modification circuit including transistor Q9 and resistor R24. Transistor Q9 has its base connected with the junction between resistors R22 and R23, its collector connected through resistor R24 with a positive input of comparator A2 and has its emitter connected with bus E3. When an exposure factor is to be changed, switch SW4 is closed to change the level at which comparator A2 operates. Shutter closing electromagnet Mg2 is connected between the output of comparator A2 and bus E1. A disconnected circuit formed by a series combination of resistor R26 and diode D4 is connected between comparator A2 and the base of transistor Q6 and is responsive to a signal from comparator A2 to interrupt the conduction of transistor Q2 through transistor Q6 whenever electromagnet Mg2 is deenergized. It is to be noted that light input to element P1 is supplied through diaphragm G1. An electromagnet drive circuit is also connected across busses E1 and E3 for energizing release electromagnet Mg1. This circuit includes a voltage divider formed by resistors R40, R41, comparator A3, release electromagnet Mg1 and transistor Q15. The junction between resistors R40 and R41 is connected with one input of comparator A3 while the junction between electromagnet Mg1 and resistor R42 is connected with the output of comparator A3 as shown. Transistor Q15 has its emitter connected with bus E1, its collector connected with the other input of comparator A3 and its base connected through resistor R13 with the output of comparator A1. It will be noted that bus E1 is connected with the ground.

A self-timer delay circuit and a supply voltage decision circuit are connected in accordance with the invention between comparators A2 and A3 of the automatic exposure control circuit. Sound producing element or unit BU and light emitting diode P2, which operate in delayed response to an output from the acoustic indicator, are also shared for indicating the voltage level determined by the decision circuit. When they are utilized in a battery check operation, they operate continuously while they operate intermittently when a display of the self-timer delay operation is desired. The selection between the use with the battery check operation and self-timer operation is made by turning knob 102 (see FIG. 4) which is exposed through the top surface of the camera to operate selection switch SW3.

Selection switch SW3 comprises a rotary switch having four fixed contacts, including contact SW3d associated with the battery check operation, contact SW3a associated with an automatic exposure mode, clear contact SW3b and contact SW3c associated with the self-timer operation. A movable contact SW30 can be selectively turned into engagement with one of these fixed contacts. It is to be noted that contact SW3a has no physical contact whatsoever with any circuit. Clear contact SW3b is connected with the gate of transistor Q2. Clear contact SW3b is provided because the electrical shutter circuit is arranged to establish an automatic exposure mode except when a battery check operation and a self-timer mode are chosen. Specifically, if the self-timer is set up and then the shutter button is depressed, but it is desired to release the shutter operation, returning the selection switch SW3 to its original position will automatically establish a circuit condition in its automatic exposure mode and immediately initiate a release operation. To prevent this, when selection switch SW3 is turned to a self-timer mode but is returned to prevent a self-timer operation, an arrangement is made so that movable contact SW30 engages both self-timer contact SW3c and clear contact SW3b so that the connection between clear contact SW3b and movable contact SW30 achieves a disconnection of the circuit with the power supply, thus resetting the electrical shutter circuit to initial condition. Consequently, unless the shutter button is depressed anew, the shutter cannot be released.

The self-timer circuit which is selected by switch SW3 comprises a series circuit including small size, sound producing unit BU and cascade-connected transistors Q13, Q12, Q10, Q4 as shown; a series circuit including diode D1 and resistor R8 connected between the base of transistor Q4 and the cathode of transistor Q2 for turning transistor Q4 on; first pulse oscillator OSC1 and second pulse oscillator OSC2 which operate unit BU and diode P2 for a continuous and an intermittent operation, respectively; delay circuit formed by a series combination of capacitor C4 and resistor R39 connected between fixed contact SW3c of selection switch SW3 and bus E3; a series circuit including light emitting diode P2 and resistor R31 connected in shunt with unit BU; and discharge resistor R32 connected in shunt with unit BU.

A battery checker circuit which includes the supply voltage decision circuit comprises a voltage divider formed by a series combination of resistors R37 and R38 connected between fixed contact SW3d and the collector of transistor Q4; comparator A4; transistor Q14 connected with the output of comparator A4; transistor Q11 connected in parallel with transistor Q10; unit BU; a series circuit including transistors Q13, Q12, Q10 and Q4; a series circuit including diode P2 and resistor R31; discharge resistor R32; and first pulse oscillator OSC1.

First pulse oscillator OSC comprises pulse oscillator A5 which is formed by capacitor C2, resistor R27 and an IC element, and produces an audio frequency signal of 1 kHz, for example. Specifically, pulse oscillator A5 is connected between bus E1 and the collector of transistor Q4, and includes resistor R27 connected between the input and the output thereof for determining an oscillation frequency, and also includes capacitor C2 connected between bus E1 and the input. The output of first pulse oscillator OSC1 is connected through resistor R28 with the base of transistor Q12.

Small size, sound producing element or unit BU may comprise a piezoelectric buzzer of known form, for example, which produces sound of a frequency determined by first pulse oscillator OSC1 when transistors Q13, Q12, Q11 and Q4 are turned on. The sound frequency is an audio frequency, which is 1 kHz in the present example.

A delay time of the self-timer is determined by the delay circuit including capacitor C4 and resistor R39, the junction therebetween is connected with a positive input of comparator A3. Resistor R39 is shunted by diode D6.

Second oscillator OSC2 comprises pulse oscillator A6 which is formed by capacitor C3, resistor R29 and an IC element, and produces a signal of a low frequency which may be 2 Hz, for example. Specifically, oscillator A6 is connected between bus E1 and the collector of transistor Q4, and resistor R29 is connected across the input and the output thereof while capacitor C3 is connected between bus E1 and the input. Capacitor C3 and resistor R29 forms a time constant circuit which determines the oscillation frequency. The signal produced by pulse oscillator A6 is applied through resistor R30 to the base of transistor Q10.

The series circuit including diode D1 and resistor R8 is connected between the cathode of transistor Q2 and the base of transistor Q4 for turning transistor Q4 on when the self-timer is in operation.

The voltage divider formed by resistors R37 and R38 is connected across the power supply E through transistor Q4 when movable contact SW30 engages fixed contact SW3d, thereby applying a voltage which is proportional to the supply voltage to comparator A4. The output of comparator A4 is connected through resistor R36 with the base of transistor Q14, the emitter of which is connected with fixed contact SW3d and is also connected with the base of transistor Q4 through diode D5 and resistor R34. The collector of transistor Q14 is connected through resistor R35 with the base of transistor Q13, which base is connected with comparator A3. The emitter of transistor Q14 is connected through resistor R33 with the base of transistor Q11, which has its collector connected with the emitter of transistor Q12 and with the collector of transistor Q10. The emitter of transistor Q11 is connected with the collector of transistor Q4 to short-circuit transistor Q10 during a battery check operation.

Figure 3:
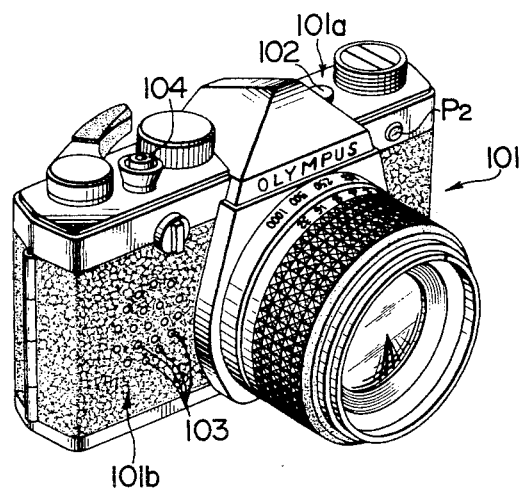
FIG. 3 is a perspective view of a single lens reflex camera incorporating the electrical shutter in which the acoustic indicator is assembled.
Figure 4:
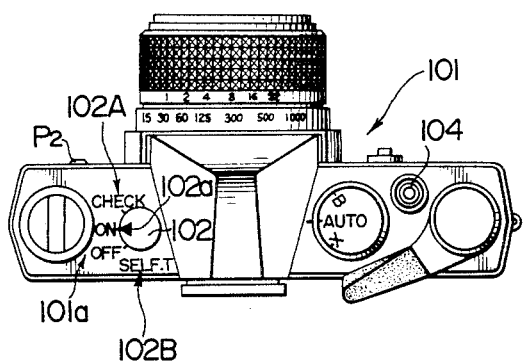
FIG. 4 is a plan view of the camera shown in FIG. 3.

FIGS. 3 and 4 show a single lens reflex camera 101 incorporating the electrical shutter circuit shown in FIG. 2. As shown in FIG. 4, camera 101 has top surface 101a in which knob 102 is rotatably mounted for changing selection switch SW3. Knob 102 carries index 102a which may be aligned with a battery check position 102A to permit a checking of a supply voltage. When the index 102a is aligned with a self-timer position 102B, the self-timer is activated.

As shown in FIG. 3, camera 101 has front surface 101b in which a number of small apertures 103 are formed to permit a sound output from unit BU (see FIG. 2) to be given off therethrough. Front surface 101b has light emitting diode P2 mounted thereon which is illuminated whenever the unit BU is activated, also providing an indication whether the supply voltage is at a proper level or that the self-timer is in operation.

The operation of the above arrangement will now be described. When knob 102 is turned to bring index 102a into alignment with battery check position 102A (see FIG. 4), movable contact SW30 engages fixed contact SW3d, whereby the voltage divider formed by resistors R37 and R38 is connected across the power supply E through switch SW3 and transistor Q4. At this time, a base current is supplied to transistor Q4 through fixed contact SW3d, diode D5 and resistor R34, thereby rendering transistor Q4 conductive. As a result, the voltage divider supplies a voltage which is proportional to the supply voltage to comparator A4. When comparator A4 determines that the supply voltage is sufficient to operate the camera, it produces an output voltage which renders transistor Q14 conductive. Then a base current is supplied to transistor Q13 to turn it on.

When transistor Q4 is turned on, a base current is also supplied through resistor R33 to transistor Q11, which is therefore turned on to short-circuit transistor Q10. As a consequence, the output of second oscillator OSC2 is short-circuited, and cannot be fed to the indicator. However, first oscillator OSC1 is connected across the supply E in response to transistor Q4 being turned on, and a pulse output having a frequency of 1 kHz is fed through resistor R28 to the base of transistor Q12, which is therefore turned on and off in accordance with the frequency of this pulse output. Since transistors Q13, Q11 and Q4 are already turned on, unit BU and diode P2 are fed with a current flow of a frequency which corresponds to the turning on and off of transistor Q12 to produce sound and to illuminate, respectively. The resulting operation appears to be continuous to the eyes and ears of a man. The sound output from unit BU is given off toward the exterior of the camera through apertures 103 (see FIG. 3). In this manner, an acoustic indication is provided that the battery has a sufficient voltage.

When the supply voltage is below a given level which is required to operate the camera, comparator A4 fails to produce an output voltage, and hence transistor Q14 cannot be turned on. Consequently, transistor Q12 cannot be turned on, whereby unit BU and diode P2 are not energized, indicating that the supply voltage is below the given level.

When it is desired to operate the self-timer, knob 102 is rotated into alignment with self-timer position 102B (see FIG. 4), whereby movable contact SW30 engages fixed contact SW3c to establish a time delay. Subsequently, shutter button 104 may be depressed to close release switch SW1. In response thereto, transistors Q1 and Q6 are turned on, and consequently transistor Q2 is turned to render transistor Q3 conductive to connect bus E3 with bus E2. Thus, transistor Q4 is turned on through diode D1 and resistor R8. As a consequence, first oscillator OSC1 produces a pulse signal of a frequency which may be 1 kHz, and which is applied to transistor Q12. In addition, second oscillator OSC2 produces a pulse signal of a frequency which may be 2 Hz and which is applied to transistor Q10. Simultaneously, the time constant circuit of the timer formed by capacitor C4 and resistor R39 begins to operate, starting the delay operation of the self-timer. In the meantime, an actuate voltage from comparator A3 is applied to transistor Q13, which is therefore turned on. Transistor Q12 is then turned on and off repeatedly in response to the pulse signal having a frequency of 1 kHz. Because transistor Q10 is being turned on and off in response to the pulse signal having a frequency of 2 Hz, it will be seen that unit BU and diode P2 will be energized only during the time both transistors Q12 and Q10 are turned on. In this manner, unit BU and diode P2 operate to produce sound and to emit light, respectively, at a given frequency of 2 Hz, thus indicating that the self-timer is in operation. It will be appreciated that during the time transistor Q10 is on, transistor Q12 will be repeatedly turned on and off in response to the pulse signal of 1 kHz. However, such switching operation of a higher frequency appears to be continuous to the eyes and ears of a man, so that they appear to repeat their operation at a frequency of 2 Hz.

In this manner, an indication is provided that the self-timer is in operation. When the preset time delay passes, the increasing potential across capacitor C4 reverses comparator A3, which energizes electromagnet Mg1 to release the shutter. The reversal of comparator A3 interrupts the supply of a base current to transistor Q13, which is therefore turned off, interrupting the energization of unit BU and diode P2, which therefore cease to operate. In response to the shutter release, photometric control is activated to determine an exposure period automatically by energizing the shutter closing electromagnet Mg2, thus completing a photographing operation with the aid of the self-timer.

Figure 5:
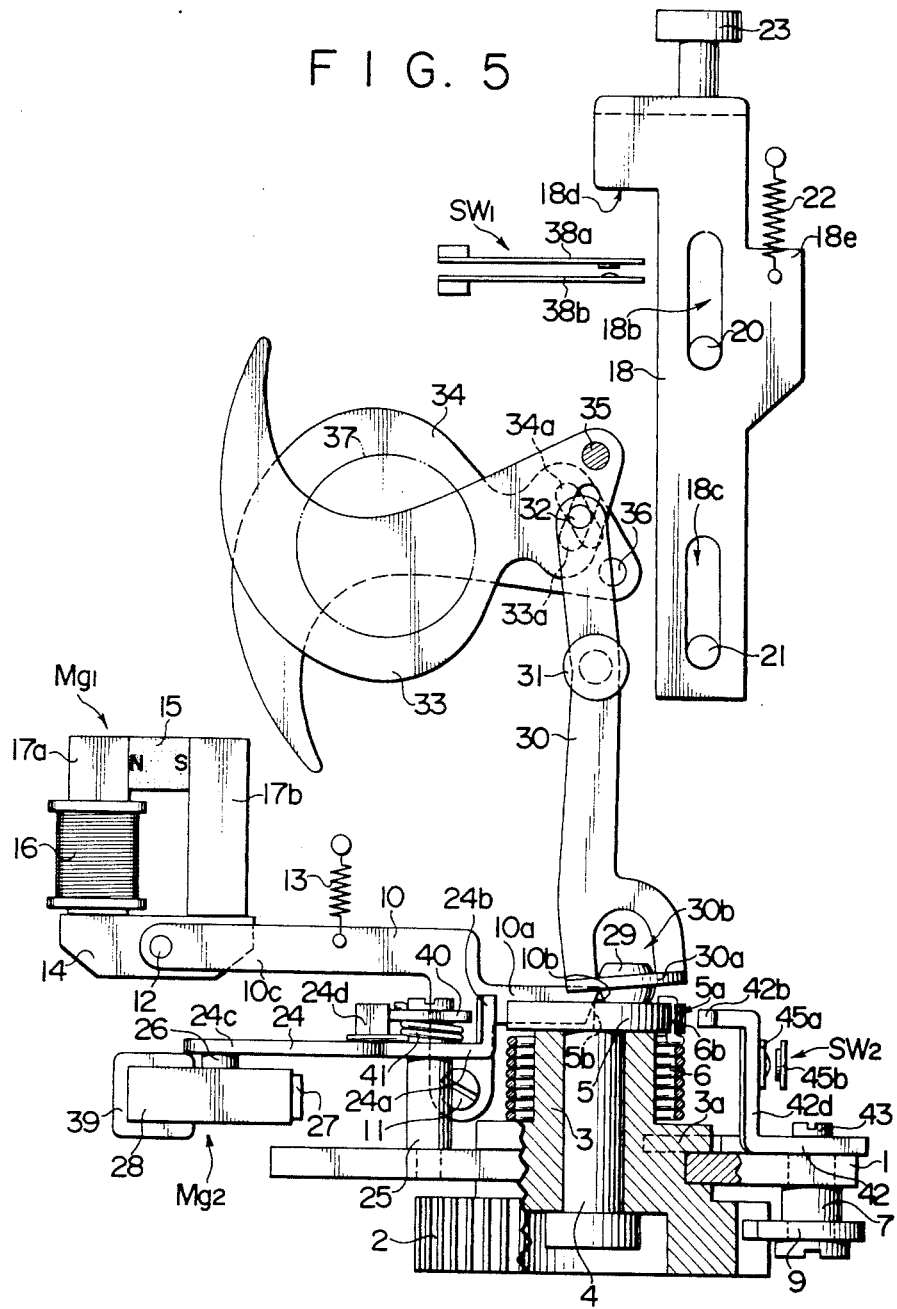
FIG. 5 is a front view of an electrical shutter mechanism of electromagnetic release type which is controlled by the electrical shutter circuit shown in FIG. 2.

Referring to FIGS. 5 to 9, an electrical shutter mechanism of electromagnetic release type will be described which is assembled into the camera 101 and which is controlled by the electrical shutter circuit of FIG. 2. Referring to FIG. 5, there is shown a baseplate 1, and a gear 2 which is integrally formed on the lower end of a hollow shaft 3 having a journal 3a which is rotatably received in the baseplate 1. A shaft 4 is rotatably received in the hollow shaft 3 and has a disc-shaped shutter drive member 5 secured to the top end. A prime mover spring 6 is disposed on the shaft 3, and has its lower end 6a (see FIG. 6) engaged with one end of a stop arm 3b which is formed on the upper end face of the journal 3a and extending in a direction perpendicular to the plane of FIG. 6. Spring 6 has its upper end 6b (see FIG. 6) engaged in a notch 5a formed in the periphery of shutter drive member 5. In this manner, the spring 6 provides an operative connection between hollow shaft 3 and shutter drive member 5.

Figure 6:
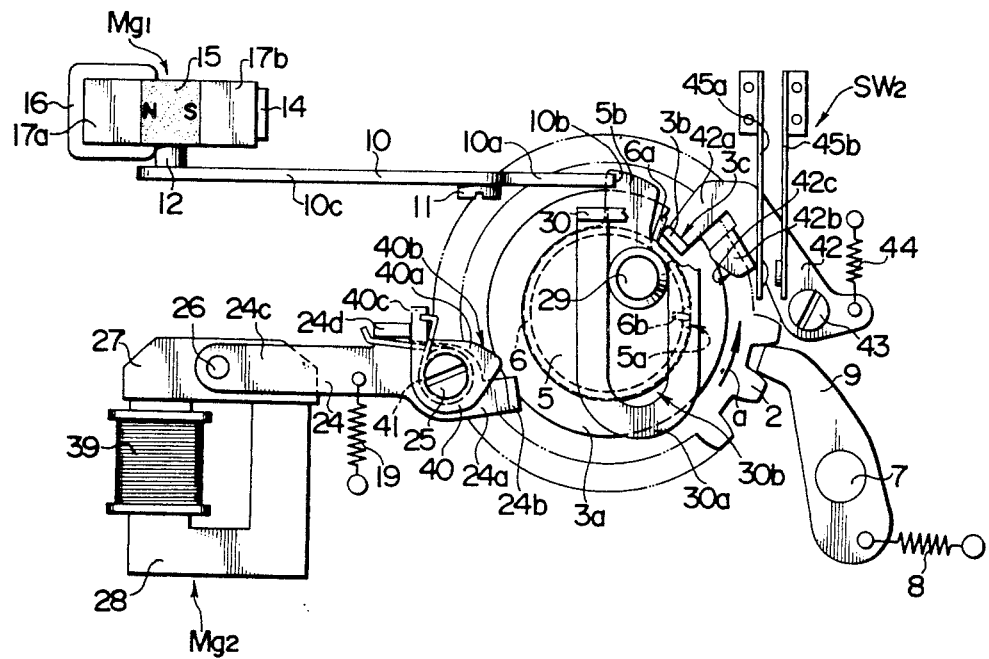
FIG. 6 is a plan view of the shutter mechanism shown in FIG. 5.

Gear 2 is operatively connected with a film winding mechanism, not shown, which may have a known arrangement and is adapted to rotate in a direction indicated by an arrow a shown in FIG. 6 in response to a film winding operation. Gear 2 is engaged by a ratchet pawl 9 which is mounted on stud 7 and urged by coiled spring 8 into engagement with the gear, thus preventing rotation of gear 2 in the opposite direction from that shown by the arrow a.

Figure 7:
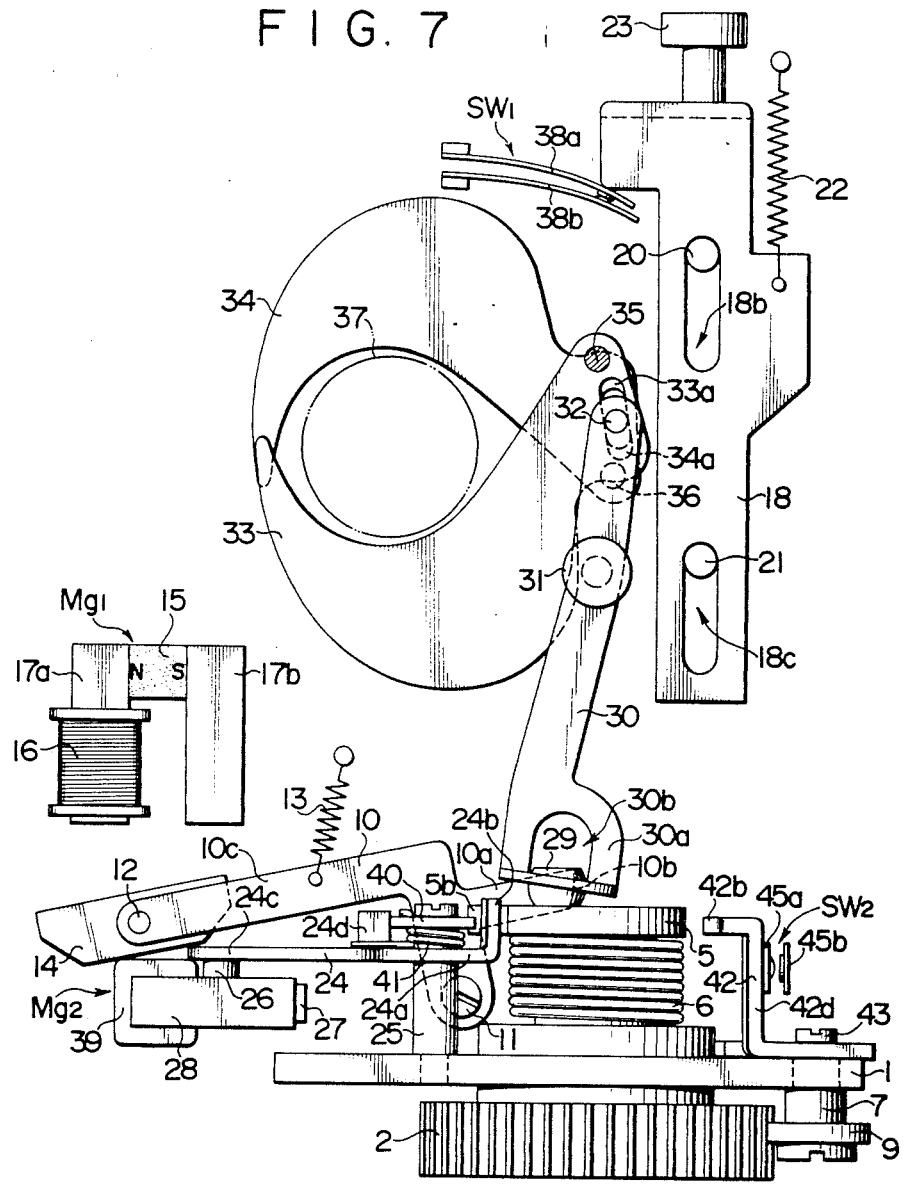

As shown in FIG. 6, shutter drive member 5 is peripherally formed with an arm 5b, against which a detent arm 10a abuts, the arm 10a being formed as one arm of detent member 10 which defines the start position of the shutter drive member. As shown in FIGS. 5 and 6, detent member 10 is in the form of a lever which is pivotally mounted on pin 11. In FIGS. 5 and 7, the detent arm 10a has an edge 10b which represents a bevelled surface which is inclined in an oblique direction downwardly and to the left, thus providing a linear contact against one lateral edge of the arm 5b. The detent member 10 has another arm 10c which extends in the opposite direction from detent arm 10a and which has an armature piece 14 secured to its free end by means of pin 12, the armature piece 14 being adapted to be held attracted to shutter release electromagnet Mg1. The arm 10c is engaged by coiled tension spring 13, thus normally urging detent member 10 to rotate clockwise about pin 11. As a consequence, the edge 10b of the detent arm 10a is brought into abutment against arm 5 while armature piece 14 bears against the mating surface of electromagnet Mg1.

In the present embodiment, the magnet Mg1 comprises a combination of permanent magnet 15 and solenoid coil 16 and thus forms a release electromagnet. Specifically, permanent magnet 15 is held between a pair of yokes 17a, 17b, and coil 16 is disposed on yoke 17a. Usually, the magnetic force from permanent magnet 15 holds the armature piece 14 attracted to the ends of the yokes, thus constraining it. However, when coil 16 is energized to magnetize the electromagnet comprising the yokes and coil in a direction to counteract the magnetic force from permanent magnet 15, the armature piece 14 is released from constraint. The exciting current may be a current pulse.

Located in the path of rotation of arm 5b of the drive member 5 is controller 24b formed on one arm 24a of another detent member 24 and which is engaged by arm 5b when shutter blades 33, 34, to be described later, assume their fully open positions. The detent member 24 is in the form of a lever which is pivotally mounted on a pin 25 secured to the baseplate 1. Controller 24b is in the form of an upstanding piece formed at the free end of arm 24a and is located in the path of rotation of arm 5b. Detent member 24 has another arm 24c which extends in the opposite direction from the arm 24a and which has an armature piece 27 secured to its free end by means of pin 26, the armature piece 27 being held attracted to electromagnet Mg2 which controls the shutter closing operation. Electromagnet Mg2 comprises a channel-shaped yoke 28 and exciting coil 39. When the coil 39 is energized, it holds the armature piece 27 attracted thereto to thereby constrain it while it frees the latter when deenergized.

The arm 24c is engaged by coiled tension spring 19, which normally urges the detent member 24 to rotate counterclockwise about pin 25. As a consequence, the controller 24b is located in the path of movement of the arm 5b and the armature piece 27 is held in abutment against the mating surface of electromagnet Mg2. Pin 25 is fixedly mounted on the upper surface of detent member 24 and pivotally mounts an engagement control member 40, which is formed with a bulging edge 40a which is located adjacent to the controller 24b on the side thereof which is advanced, as viewed in the counter-clockwise rotation of the arm 5b, and which extends into the path of rotation of the arm 5b. On its side remote from the controller 24b, the edge 40a has a bevelled surface 40b, the arrangement being such that as arm 5b rotates counter-clockwise, it initially bears against the bevelled surface 40b to expel it to cause a clockwise rotation of control member 40 about pin 25, and then engages the controller 24b. Control member 40 and detent member 24 are operatively connected together by means of spring 41 so as to form a double lever. Specifically, spring 41 comprises a torsion spring disposed on pin 25 and has its one end engaged with upstanding piece 24d, formed along one lateral edge of the arm 24c, and its other end engaged with extension 40c projecting in a direction at right angles to the edge 40a. Consequently, control member 40 is urged to rotate counter-clockwise about pin 25, but the resulting rotation is blocked normally by the abutment of extension 40c against upstanding piece 24d to maintain the bulging edge 40a in the path of rotation of arm 5b.

As shown in FIG. 6, the journal 3a is formed with notch 3c engaged by a film locking hook 42, at a position outwardly of stop arm 3b which is engaged by the lower end 6a of spring 6. Hook 42 is pivotally mounted on stationary stud 43 and is urged to rotate counter-clockwise about stud 43, by coiled tension spring 44 which engages the rear end thereof. As shown, hook 42 has an inverted L-configuration extending from the pivoted end, having a hook end 42a which is adapted to engage notch 3c. An upright piece 42d extends vertically upward from its lateral edge located nearer journal 3a intermediate its length, and is formed with release arm 42d which is bent from the arm 42b to extend toward the path of rotation of arm 5b. Release arm 42b is formed with bevelled edge 42c at a location nearer the journal as viewed in the direction of rotation of arm 5b. Thus arm 5b is capable of engaging bevelled edge 42c to rotate hook 42 clockwise about pivot 43, thus moving hook end 42a out of notch 3c. However, the resilience of spring 44 normally urges hook 42 to rotate counter-clockwise about pin 43, as shown in FIG. 6, whereby hook end 42a engages notch 3c to prevent a rotation of hollow shaft 3 to provide a film locking function. Under this condition, the bevelled edge 42c is located in the path of rotation of arm 5b.

As shown in FIGS. 5 and 6, a normally open switch SW2 comprising resilient blades 45a, 45b is disposed adjacent to but outwardly of upright piece 42d. The purpose of switch SW2 is to disconnect the shutter circuit from a power source upon termination of a film winding operation. The switch is closed by upright piece 42d when hook 42 rotates clockwise about pin 43, and is opened upon termination of a film winding operation when hook 42 rotates counter-clockwise about pin 43 and hook end 42a engages notch 3c.

FIG. 5 shows shutter release member 18 which is a vertically elongated rod having a pair of vertically spaced elongated slots 18b, 18c formed therein, which are fitted over stationary pins 20, 21, thus enabling a sliding movement thereof in the vertical direction. Release member 18 is pulled upwardly by coiled spring 22, and the extent of such movement is defined by the engagement between stationary pin 21 and slot 18c. Shutter release button 23 is fixedly attached to the top end of release member 18.

Drive pin 29 is fixedly mounted on the upper end face of shutter drive member 5 adjacent to the periphery in the upper and right-hand region thereof, as viewed in FIG. 6. Pin 29 fits in elongated opening 30b defined by horizontally extending U-shaped portion 30a formed at the lower end of connecting rod 30, shown in FIG. 5. It is to be understood that only the lower portion of connecting rod 30 is shown in FIG. 6.

As indicated in FIG. 5, connecting rod 30 is pivotally mounted on stud 31, and fixedly carries pin 32 on its upper end which fits in and simultaneously engages elongated slots 33a, 34a, which are formed in one end of shutter blades 33, 34. These shutter blades 33, 34 are pivotally mounted on separate studs 35, 36, and close a photographing optical path represented by chain line 37 under the condition shown in FIG. 5. Shutter blades 33, 34 constitute together a so-called vario type shutter, and opens or closes the optical path 37 in accordance with the oscillating motion of connecting rod 30 about stud 31 as the shutter drive member 5 rotates under the resilience of spring 6 to move drive pin 29.

As shown in FIG. 5, shutter release member 18 is formed with step 18d adjacent to its top end and on the left-hand side thereof, and a normally open release switch SW1 comprising resilient blades 38a, 38b is disposed below step 18d. The switch SW1 remains open under the condition shown in FIG. 5.

The operation of electrical shutter will now be described. FIGS. 5 and 6 show the shutter mechanism in its charged condition after the completion of a film winding operation. Spring 6 is charged to urge shutter drive member 5 to rotate counter-clockwise, but such movement is constrained by the abutment of arm 5b against the detent portion 10b of the detent member 10 which is constrained by shutter release electromagnet Mg1. Thus, drive member 5 is maintained at rest in its start position. The bevelled surface of the detent edge 10b is urged in the upward direction by arm 5b under this condition.

When shutter release button 23 is now depressed, release member 18 moves down, with its step 18d closing release switch SW1. Then the electrical shutter circuit shown in FIG. 2 is activated, and the charge on capacitor C5 discharges through shutter release electromagnet Mg1 in pulse-like manner, thus counteracting the attraction of the electromagnet. Upon demagnetization, the armature piece 14 which has been constrained by magnet Mg1 is freed, so that arm 5b expels the detent edge 10b under the resilience of spring 6 to cause detent member 10 to rotate counter-clockwise about the shaft 11, thus starting the shutter drive member 5. When the detent is released, the bevelled surface of the detent edge 10b presents a reduced frictional resistance with respect to arm 5b, thus assuring a facilitated disengagement thereof.

When drive member 5 rotates in the direction of arrow a shown in FIG. 6 and reaches its position shown in FIG. 8, drive pin 29 which is integral therewith causes connecting rod 30 to be rocked from its position shown in FIG. 5 to its position shown in FIG. 7, whereby shutter blades 33, 34 cooperate with each other to begin opening. The photographing optical path 37 is completely opened as shown in FIG. 7 when arm 5b expels the bulging edge 40a of control member 40 to be locked by controller 24b (see FIG. 8).

When arm 5b expels the bulging edge 40a, control member 40 rotates clockwise about the stud 25 against the resilience of its associated spring 41, whereby limbs 24c and 40d move apart to facilitate a movement of detent member 24 away from electromagnet Mg2. Since arm 5b abuts against the bevelled edge 40b before it is locked by controller 24b, it does not abut against the controller 24b with an increased force, thus achieving a smooth locking action and assuring a full opening of shutter blades 33, 34 without causing a bouncing thereof.

At the same time as the electromagnet Mg1 is energized, the automatic exposure control circuit is activated to effect photometry by integrating the amount of light reflected by an object being photographed. When a proper exposure value is reached, electromagnet Mg2 is deenergized to close the shutter. Electromagnet Mg2 is energized immediately when transistor Q3 is turned on, thereby attracting armature piece 27 to coil 28 and constraining detent member 24. The constraint is removed upon deenergization, whereupon detent member 24 rotates clockwise about pin 25 since its controller 24b is urged by arm 5b, thus moving controller 24b out of the path of rotation of arm 5b. When shutter drive member 5 has rotated counter-clockwise from the position of FIG. 8 to the position of FIG. 9, the arm 5b abuts against the side of stop arm 3b, whereupon the shutter drive member 5 ceases to rotate. Shutter blades 33, 34 begin to close as the shutter drive member 5 begins to rotate from the position of FIG. 8, and fully close the optical path 37 at the stop position of the drive member 5.

Immediately before abutting against the side of stop arm 3b, arm 5b expels bevelled edge 42c of hook 42 from its path of movement, which therefore rotates clockwise about stud 43 against the bias applied thereto, disengaging hook end 42a from notch 3c. Rotation of hook 42 causes disconnection switch SW2 to be closed with its upstanding piece 42d, thus short-circuiting the anode-gate path of transistor Q2 (see FIG. 2) to turn it off to thereby interrupt the connection with the power supply.

When a film winding operation takes place after the completion of an automatic exposure in the manner mentioned above, gear 2 is rotated, whereby its integral stop arm 3b drives the lower end 6a of spring 6, and rotates the shutter drive member 5 through the spring 6 until arm 5b bears against bevelled edge 10b of detent member 10. Then the shutter drive member remains at rest in its start position while only gear 2 continues to rotate to charge the spring 6. As hollow shaft 3 rotates to bring notch 3c into alignment with hook end 42a, hook 42 rotates counter-clockwise about stud 43 under its own bias to engage hook end 42a with notch 3c, thus locking the film and stopping the rotation of hollow shaft 3. When the film winding operation terminates, the various members assume their initial positions shown in FIGS. 5 and 6 in preparation for the next photographing operation.

Figures 9, 10:
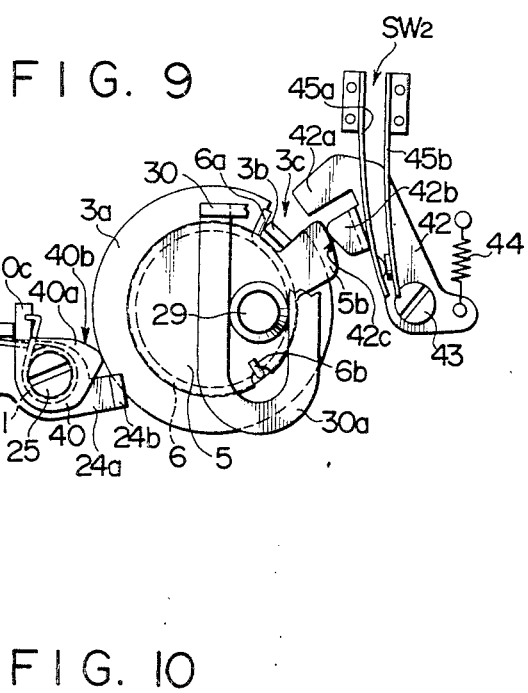

FIG. 10 shows another form of the electrical shutter circuit according to the invention. The circuit includes power supply E across which are connected in series with release switch SW101 a series circuit including sound producing element or unit BU and transistors Q101 and Q102; first pulse oscillator OSC1; supply voltage decision circuit PJC; automatic exposure control circuit APC; self-timer circuit STC; and second pulse oscillator OSC2.

As before, the unit BU comprises a piezoelectric buzzer and is connected in parallel with a series combination of light emitting diode P2 and resistor R131, and also in parallel with discharge resistor R132. As before, first pulse oscillator OSC1 comprises a pulse oscillator which produces a pulse signal of an audio frequency such as 1 kHz, for example. The oscillator output is supplied through resistor R101 to the base of transistor Q101. Again, second pulse oscillator OSC2 is adapted to produce a pulse signal of a low frequency such as 2 Hz, for example, and its oscillator output is applied to the base of transistor Q101. The output of supply voltage decision circuit PJC is fed through resistor R102 to the base of transistor Q102. The output of self-timer circuit STC is connected with shutter release electromagnet Mg1, and the output of automatic exposure control circuit APC is connected with shutter closing electromagnet Mg2.

Release switch SW101 is shunted by switching transistor Q103 which connects supply voltage decision circuit PJC with power supply E. An operating voltage is supplied to the base of transistor Q103 from the positive terminal of the supply E through battery check switch SW102 and resistor R103. The junction between switch SW102 and resistor R103 is connected with second pulse oscillator OSC2 and self-timer circuit STC. When switch SW102 is closed, both self-timer circuit STC and second pulse oscillator OSC2 are disabled. Self-timer circuit STC includes self-timer setting switch SW103, which is closed to operate self-timer circuit STC whenever the self-timer is to be used.

In the described shutter circuit, the battery voltage can be checked by closing switch SW102. Upon closure of this switch SW102, switching transistor Q103 is turned on to connect decision circuit PJC across the supply E while disabling self-timer STC and second pulse oscillator OSC2. When circuit PJC determines that the supply voltage is sufficient to operate the camera, an output voltage therefrom is fed through resistor R102 to the base of transistor Q102, which is therefore turned on. When transistor Q103 is turned on, first pulse oscillator OSC1 initiates its oscillating operation, and applies a pulse output having a frequency of 1 kHz to the base of transistor Q101.

Consequently, as transistor Q102 is turned on, unit BU and diode P2 are energized with the pulse signal having a frequency of 1 kHz, producing sound and emitting light to indicate that the supply voltage is sufficient. While the current which energizes the unit BU and diode P2 has a high frequency of 1 kHz, their operation appears to be continuous to the eyes and ears of a man. When the supply voltage is below a given level, decision circuit PJC produces no output voltage, and hence the unit BU and diode P2 are not energized, producing no sound or emitting no light to indicate that the supply voltage is at a low level.

When switch SW103 is closed, both the pulse signal having the frequency of 1 kHz from first pulse oscillator OSC1 and the pulse signal having the frequency of 2 Hz from second pulse oscillator OSC2 are jointly applied to the base of transistor Q101. Sine the closure of release switch SW101 applies an output voltage from decision circuit PJC to transistor Q102, current having a frequency of 1 kHz and which is periodically interrupted at a frequency of 2 Hz flows through the unit BU and diode P2, causing the unit BU to produce sound intermittently and to cause a flashing of diode P2 to indicate that the self-timer is in operation.

What is claimed is:

1. A camera for use with a power supply providing a supply voltage; said camera comprising an electrically controlled shutter means adapted to be operated from the power supply; a self-timer delay circuit operative for delaying the operation of said electrically controlled shutter means for a given time interval; a single acoustic indicator including a single common acoustic speaker comprising first means for producing a first sound when the supply voltage is above a selected level and second means for producing a second sound different from said first sound responsive to the operation of said self-timer delay circuit.

2. A camera for use with a power supply providing a supply voltage; said camera comprising an electrically controlled shutter means adapted to operate from the power supply; an acoustic indicator; a first switch; a supply voltage decision circuit adapted to be selectively connected across the power supply of the electrically controlled shutter means through operation of said first switch, said supply voltage decision circuit producing an output signal when the supply voltage is above a given level which is sufficient to operate said electrically controlled shutter means; an exposure control circuit for operating said electrically controlled shutter means and for producing an output signal during such operation; a self-timer delay circuit for delaying the operation of said exposure control circuit for a given time interval and for providing an output signal during said given time interval; and an indicator circuit including a switching device which is turned on in response to either the output signal from one of two circuits including said self-timer delay circuit and or the output signal from said supply voltage decision circuit; said acoustic indicator comprising an acoustic alarm unit for producing sound, a first pulse oscillator for producing a continuous pulse output signal having an audio frequency, a first transistor which is turned on and off by said output signal from said first pulse oscillator, a second pulse oscillator for producing a pulse signal having a low frequency, a second transistor connected in series with said first transistor and adapted to be turned on and off in response to said low frequency pulse signal from the second pulse oscillator, whereby said continuous output signal from the first pulse oscillator is converted into an intermittent output signal, a third transistor for shortcircuiting said second transistor when said supply voltage decision circuit is producing its output signal, whereby the said acoustic alarm unit produces sound intermittently to indicate that said self-timer delay circuit is in operation, and said alarm unit produces sound continuously when said supply voltage is above said given level.

3. A camera for use with a power supply providing a supply voltage; said camera comprising an electrically controlled shutter means adapted to be operated from the power supply; an acoustic indicator; a supply voltage decision circuit adapted to be selectively connected across the power supply, said supply voltage decision circuit being operative when the supply voltage is above a given level which is sufficient to operate said electrically controlled shutter means; an exposure control circuit for operating said electrically controlled shutter means; a self-timer delay circuit operative for delaying the operation of said exposure control circuit for a given time interval; a first pulse oscillator for producing a first pulse output signal having a first audio frequency; said acoustic indicator comprising an acoustic alarm unit being a single common acoustic speaker for producing a first sound in response to said first pulse output signal from said first pulse oscillator when said supply voltage decision circuit is operative, and a second pulse oscillator for producing a second pulse output signal having a second audio frequency and applying it to said acoustic alarm unit when said self-timer delay circuit is operative, said acoustic alarm unit producing a second and different sound from that produced when the supply voltage decision circuit is operative.

4. A camera for use with a power supply providing a supply voltage; said camera comprising an electrically controlled shutter means adapted to be operated from the power supply; an acoustic indicator; a supply voltage decision circuit adapted to be selectively connected across the power supply of the electrically controlled shutter means, said supply voltage decision circuit producing an output signal when the supply voltage is above a given level which is sufficient to operate the electrically controlled shutter means; an exposure control circuit for operating the electrically controlled shutter means; a self-timer delay circuit operative for delaying the operation of said exposure control circuit for a given time interval; a first switching device which is turned on responsive to said output signal from said supply voltage decision circuit; said acoustic indicator comprising an alarm unit for producing sound, a first pulse oscillator for producing a first pulse output signal having an audio frequency, a second pulse oscillator for producing a second pulse output signal having a lower frequency than that of the first pulse output signal only when said self-timer delay circuit is operative, and a second switching device which is turned on and off by said pulse output signals from said first and second pulse oscillators, said acoustic alarm unit and said first and second switching devices being coupled in series, whereby said acoustic alarm unit produces an intermittent sound indicative of operation of said self-timer or a continuous sound indicative of the supply voltage being above said given level.

5. The camera according to claim 2, 3, or 4 further comprising a light emitting device coupled in parallel with said acoustic alarm unit.

* * * * *

UNITED STATES PATENT AND TRADEMARK OFFICE
CERTIFICATE OF CORRECTION

PATENT NO. : 4,272,176
DATED : June 9, 1981
INVENTOR(S) : Yoshihisa Maitani; Isao Kondo; Kazuyuki Nemoto; and Masahiro Kitagawa It is certified that error appears in the above—identified patent and that said Letters Patent is hereby corrected as shown below:

Column 10, line 17, change "42d" to --42b--.

Column 10, line 17, change "42b" to --42d--.

Column 11, line 65, change "coil" to --core--.

Signed and Sealed this

First Day of September 1981

[SEAL]

Attest:

GERALD J. MOSSINGHOFF

Attesting Officer    Commissioner of Patents and Trademarks